(12) United States Patent
Geary

(10) Patent No.: US 9,062,739 B2
(45) Date of Patent: Jun. 23, 2015

(54) ELECTRIC CYLINDER

(71) Applicant: Delaware Capital Formation, Inc., Wilmington, DE (US)

(72) Inventor: James Geary, Pawcatuck, CT (US)

(73) Assignee: Delaware Capital Formation, Inc., Wilmington, DE (US)

( * ) Notice: Subject to any disclaimer, the term of this patent is extended or adjusted under 35 U.S.C. 154(b) by 218 days.

(21) Appl. No.: 13/658,059

(22) Filed: Oct. 23, 2012

(65) Prior Publication Data

US 2013/0116072 A1  May 9, 2013

Related U.S. Application Data

(60) Provisional application No. 61/556,981, filed on Nov. 8, 2011.

(51) Int. Cl.
*B66D 1/14* (2006.01)
*F16F 15/00* (2006.01)

(52) U.S. Cl.
CPC ............ *F16F 15/005* (2013.01); *F16F 2230/24* (2013.01); *F16F 2232/04* (2013.01)

(58) Field of Classification Search
USPC ........... 269/239, 225, 32, 228, 201, 3, 6, 237, 269/238, 24, 27; 425/451.2, 451.7, 451.9, 425/590, 595
See application file for complete search history.

(56) References Cited

U.S. PATENT DOCUMENTS

| | | | |
|---|---|---|---|
| 2,484,344 A * | 10/1949 | Hiller et al. .................... | 164/312 |
| 3,580,459 A | 5/1971 | Gage | |
| 3,613,983 A | 10/1971 | Gage | |
| 4,336,926 A | 6/1982 | Inagaki et al. | |
| 4,797,086 A * | 1/1989 | Adachi .......................... | 425/589 |
| 4,926,731 A | 5/1990 | Kawabata | |
| 4,929,165 A * | 5/1990 | Inaba et al. .................... | 425/150 |
| 4,930,261 A | 6/1990 | Tiegs et al. | |
| 4,934,202 A | 6/1990 | Hikita et al. | |
| 4,968,239 A * | 11/1990 | Inaba et al. .................... | 425/150 |
| 5,879,726 A | 3/1999 | Hsing | |
| 6,070,864 A | 6/2000 | Crorey | |
| 6,254,371 B1 * | 7/2001 | McNally et al. .............. | 425/214 |
| 6,883,795 B2 | 4/2005 | McCormick et al. | |
| 6,893,246 B2 | 5/2005 | Teng et al. | |
| 7,121,539 B2 | 10/2006 | McCormick et al. | |
| 7,128,563 B2 | 10/2006 | Teng et al. | |
| 7,484,954 B2 * | 2/2009 | Kestle et al. ................... | 425/595 |
| 7,604,037 B2 * | 10/2009 | Kato et al. ..................... | 164/137 |
| 2002/0018826 A1 * | 2/2002 | Abe et al. ..................... | 425/451.6 |
| 2007/0296119 A1 * | 12/2007 | Kestle et al. ............... | 264/328.1 |
| 2011/0133382 A1 | 6/2011 | Ueura | |

* cited by examiner

*Primary Examiner* — Emmanuel M Marcelo
(74) *Attorney, Agent, or Firm* — Harness, Dickey & Pierce, P.L.C.

(57) ABSTRACT

An electric cylinder has a cylinder housing and a clamping assembly in the cylinder housing. An electric motor assembly is coupled with the clamping assembly to drive the clamping assembly between a first and second position. The electric motor assembly has an electric motor with a rotary output. The clamping assembly has a drive pulley assembly coupled with the rotary output. A lead screw is rotatably coupled with the drive pulley for axial movement. The lead screw moves between the first and second positions. A compliance coupling is positioned between the lead screw and the drive pulley. The compliance coupling is axially movable in the pulley assembly for absorbing shock when the piston assembly encounters a stop.

18 Claims, 3 Drawing Sheets

ELECTRIC CYLINDER

CROSS-REFERENCE TO RELATED APPLICATION

Figure 1:
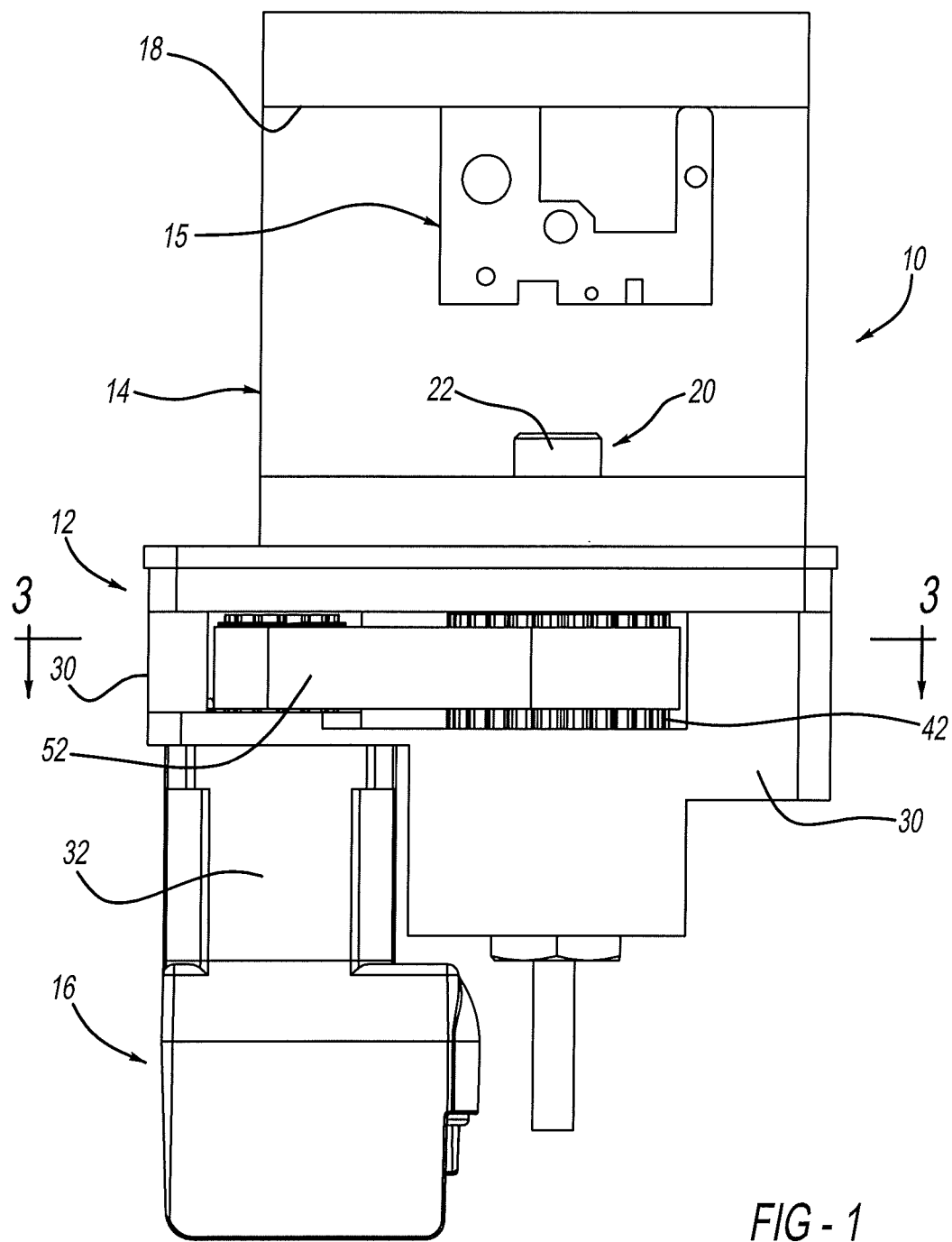

This application claims the benefit of U.S. Provisional Application No. 61/556,981, filed Nov. 8, 2011. The entire disclosure of the above application is incorporated herein by reference.

FIELD

The present disclosure relates to cylinders and, more particularly, to an electric drive cylinder with a device to absorb the end of stroke impact shock energy.

BACKGROUND

When utilizing various types of pneumatic cylinders, two types of cylinders exist. One type is where the cylinder provides force only at the end of its travel. The remaining type of cylinders requires force throughout their stroke. In both cases, the position is determined by loading against a hard stop in the cylinder, an external hard stop or an immovable object in the path of motion.

Electrical linear drives or electric drive cylinders exist in the industry. These linear drives are utilized for force output applications. Most of the drives are designed for positioning and not for force generation. The drives are very complex and costly. They contain controllers that utilize programming that provides deceleration of the piston prior to contacting the end stops.

A problem exists in that the linear drives are not utilized for general applications. This is especially the case where a hard stop is contacted. Here, the entire device receives a shock load that usually damages the entire drive train unless deceleration is preprogrammed into the linear drive. In many of these applications, the positioning point of where the device meets the load, may not be known. Thus, this point cannot be programmed into the controller in advance of contacting the object. Also, these devices increase the costs of the device which, in turn, makes them an unattractive solution for simple force generation applications. Additionally, where electric linear drives are utilized in air cylinder applications, the electrical linear drive is usually much larger than its pneumatic counterpart. Accordingly, to be acceptable, the device must have a size relative to that of the pneumatic cylinder.

SUMMARY

The present disclosure provides a compact mechanical device that simply converts an electric motor's rotational motion to a linear motion and its torque to force. The device provides a compliant coupling to absorb the end stroke impact shock energy. Additionally, the device absorbs lost motion of the coupling to enable unjamming of the drive components.

According to a first aspect of the disclosure, an electric drive cylinder comprises a cylinder housing and a clamping assembly in the housing. An electric motor assembly is coupled with the clamping assembly to drive the clamping assembly between a first and second position. The electric motor assembly further comprises an electric motor with a rotary output. The clamping assembly includes a lead screw, compliance coupling and drive pulley. The drive pulley is coupled with the rotary output. A lead screw, part of the clamping assembly, is rotatably coupled with the drive pulley for axial movement. The lead screw moves between the first and second positions. A compliance coupling is positioned between the lead screw and the drive pulley. The compliance coupling is axially movable in the pulley to absorb shock when the lead screw encounters a hard stop. A lead nut is positioned between the lead screw and the compliance coupling. The lead nut translates the rotary motion of the pulley into linear motion of the lead screw. A force absorbing mechanism is in the pulley to absorb axial shock loads at an end of travel of the compliance coupling. The compliance coupling includes at least one member to rotationally fix the compliance coupling with the pulley and enable axial movement of the coupling with respect to the pulley. The drive pulley includes a hollow housing. The compliance coupling includes at least one member to rotationally fix the compliance coupling in the hollow pulley housing and enable axial movement of the coupling with respect to the pulley. The lead nut seats in the compliance coupling. A drive belt is coupled with the motor rotary output and the pulley.

According to a second aspect of the disclosure, a device for absorbing end stroke impact shock energy of an electric drive cylinder comprises an electric motor assembly adapted to couple with a clamping assembly to drive the clamping assembly between a first and second position. The electric motor assembly further comprises an electric motor with a rotary output. The clamping assembly includes a drive pulley, lead screw and compliance coupling. The drive pulley is coupled with the rotary output. The lead screw is rotatably coupled with the drive pulley for axial movement. The lead screw moves between the first and second positions. A compliance coupling is positioned between the lead screw and the drive pulley. The compliance coupling is axially movable in the pulley to absorb shock when the lead screw encounters a hard stop. A lead nut is positioned between the lead screw and the compliance coupling. The lead nut translates the rotary motion of the pulley into linear motion of the lead screw. A force absorbing mechanism is in the pulley to absorb axial shock loads at an end of travel of the compliance coupling. The compliance coupling includes at least one member to rotational fix the compliance coupling with the pulley and enables axial movement of the coupling with respect to the pulley. The drive pulley includes a hollow housing. The compliance coupling includes at least one member to rotationally fix the compliance coupling in the hollow pulley housing to enable axial movement of the compliance coupling with respect to the pulley. The lead nut seats in the compliance coupling. A drive belt is coupled with the motor rotary output and the pulley.

According to a third aspect of the disclosure, a compliance device for absorbing lost motion to enable unjamming of drive components of an electric drive cylinder comprises an electric motor assembly adapted to couple with a clamping assembly to drive the clamping assembly between a first and second position. The electric motor assembly further comprises an electric motor with a rotary output. The clamping assembly includes a drive pulley, lead screw and compliance coupling. The drive pulley is coupled with the rotary output. The lead screw is rotatably coupled with the drive pulley for axial movement. The lead screw moves between the first and second positions. A compliance coupling is positioned between the lead screw and the drive pulley. The compliance coupling is axially movable in the pulley to absorb shock when the lead screw encounters a hard stop. A lead nut is positioned between the lead screw and the compliance coupling. The lead nut translates the rotary motion of the pulley into linear motion of the lead screw. A force absorbing mechanism is in the pulley to absorb axial shock loads at an end of travel of the compliance coupling. The compliance coupling includes at least one member to rotationally fix the compliance coupling with the pulley and enables axial movement of the coupling with respect to the pulley. The drive pulley includes a hollow housing. The compliance coupling includes at least one member to rotationally fix the compliance coupling in the hollow pulley housing to enable axial movement of the compliance coupling with respect to the pulley. The lead nut seats in the compliance coupling. A drive belt is coupled with the motor rotary output and the pulley.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
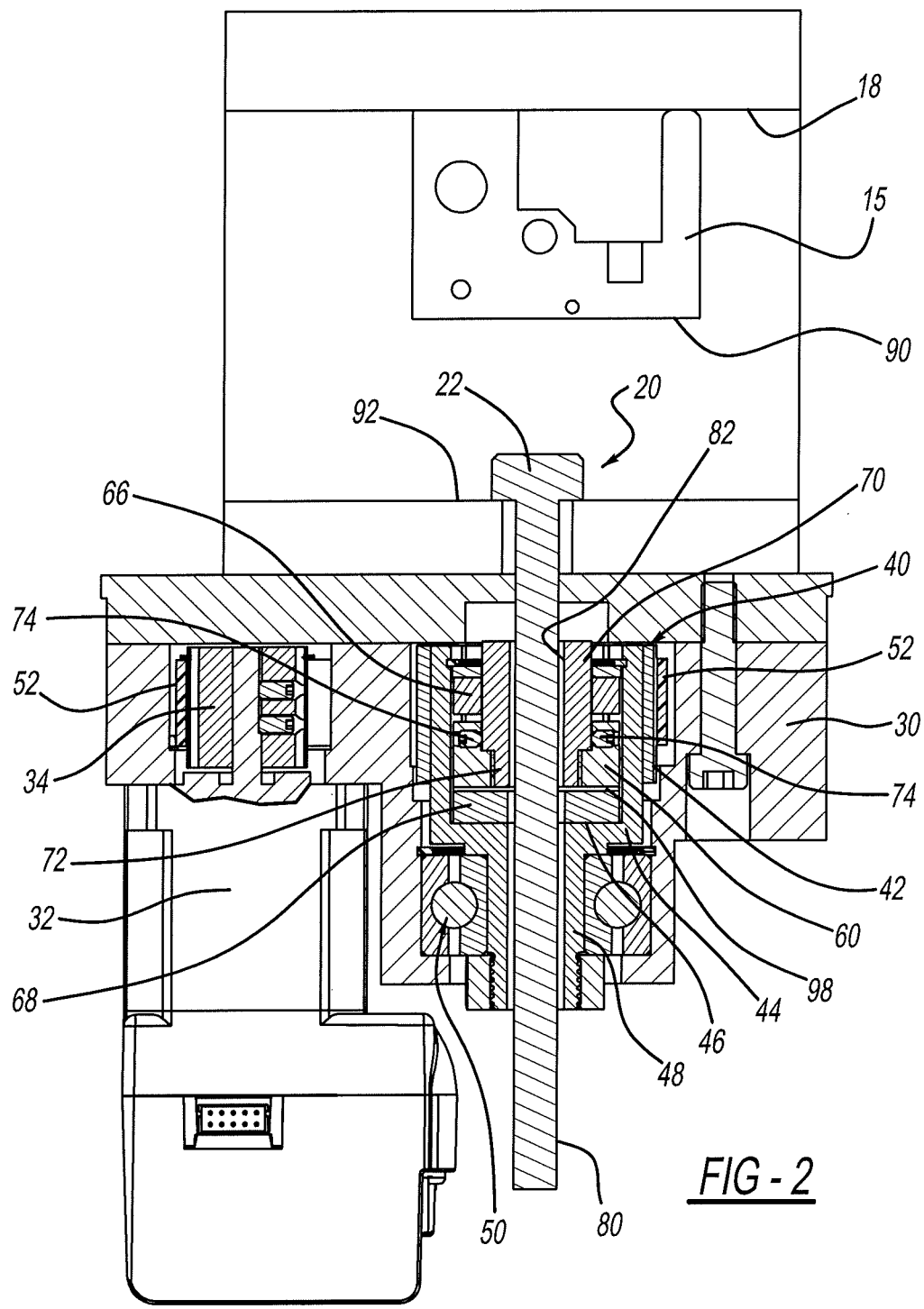
Figure 3:
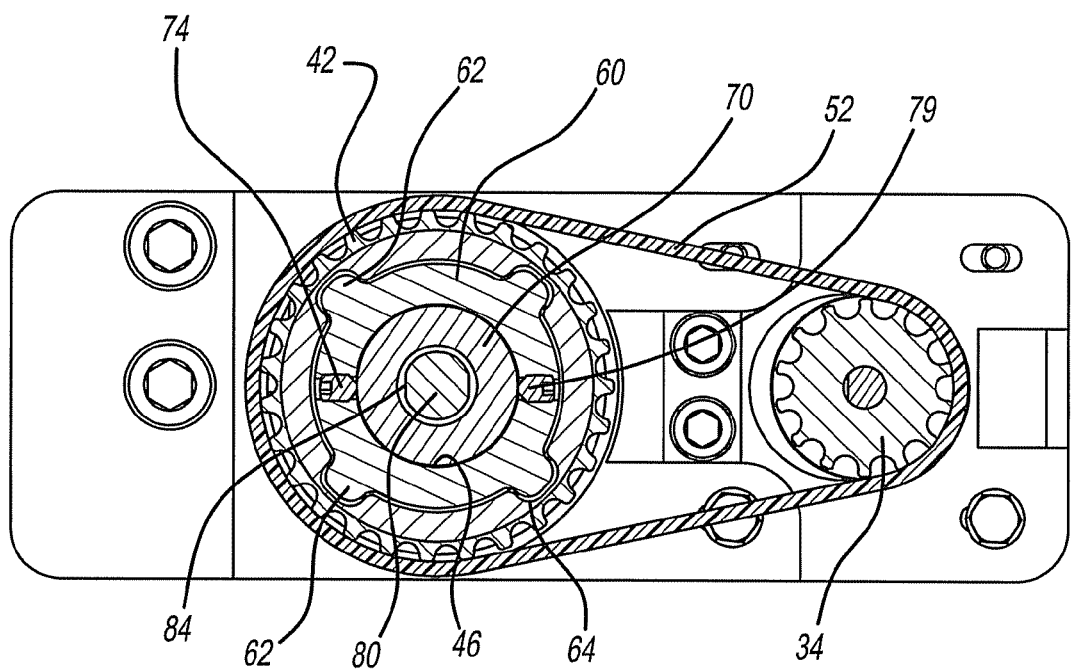

FIG. 1 is a perspective view of an electric cylinder.
FIG. 2 is a cross-section view of FIG. 1
FIG. 3 is a cross-section view of FIG. 1 along lines 3-3 thereof.

DETAILED DESCRIPTION

Turning to the figures, an electric drive cylinder is illustrated and designated with the reference numeral 10. The electric drive cylinder 10 includes a cylinder housing 12, a head 14 with stop 18 and a motor assembly 16. A clamping assembly 20 is positioned in the cylinder housing 12 and coupled with the motor assembly 16. The clamping assembly 20 includes a member 22 extending from the cylinder housing 12. The member 22 may contact stop 18 or clamp a workpiece 15 between it and the contact stop 18.

The motor assembly 16 includes a housing 30 coupled with the cylinder housing 12. A motor 32 is coupled with the housing 30. The motor 32 can be any type of electric motor with a rotary output 34.

The clamping assembly 20 includes a pulley assembly 40 coupled with the housing 30. The pulley assembly 40 includes a pulley 42 with a cup shaped body 44. The cup shaped body 44 includes a hollow center portion 46 and a spigot portion 48. The spigot portion 48 nests in a bearing 50 inside of the pulley assembly 40. The bearing 50 enables the pulley assembly to freely rotate in the housing 30. A drive belt 52 is coupled with the pulley 42 and the output 34. As the electric motor 32 is activated, the output 34 rotates, clockwise or counterclockwise, which, in turn, drives the belt 52 driving the pulley 42.

A compliance coupling 60 is positioned in the hollow center 46 of the cup shaped body 44 of the pulley assembly 40. The compliance coupling 60 has an overall cylindrical shape with at least one projecting spline 62 (here four are shown). The splines 62 project into cutouts 64 in the cup shaped body 44 of the pulley assembly 40. Thus, the compliance coupling 60 is rotationally fixed with respect to the pulley assembly 40; however, the compliance coupling 60 may move axially within the cup shaped body 44. A pair of shock absorbing members 66,68 such as urethane pads, springs, or elastic material, is positioned at the ends of the compliance coupling 60. The shock absorbing members 66,68 absorb the end of the travel axial shock loading of the piston assembly 40. The shock absorbing member 68 nest in the pulley cup shaped body 44 such that they can absorb lost motion in the axial direction.

A lead nut 70 is positioned inside of the compliance coupling 60. The lead nut 70 has an overall cylindrical shape with a cylindrical spigot 72 that seats in a bore of the compliance coupling 60. The compliance coupling 60 includes a pair of set screws 74 that project through radial bores in the compliance coupling to secure it to the lead nut 70. The set screws 74 enable the compliance coupling 60 to impart the rotary motion of the pulley 42 onto the lead nut 70. Thus, as the pulley 42 rotates, so does the lead nut 70.

A lead screw 80 is positioned in a threaded bore 82 in the lead nut 70. As the lead nut 70 rotates (clockwise and counterclockwise), the lead screw 80 is driven linearly up and down in the lead nut 70. This linear motion of the lead screw 80, which is coupled with the member 22, moves the clamping assembly 20 between its first and second positions. Thus, as the pulley 42 is rotated, the rotational movement of the pulley 42 is translated into linear motion of the lead screw 80. Also, the lead screw 80 includes flat portions 84 for anti-rotation purposes.

As the member 22 encounters surfaces 90, 92 on the workpiece 15 and head 14, the compliance coupling 60 contacts the shock absorbing members 66,68 to absorb the shock in the drive as it contacts the surfaces 90, 92. Additionally, if the pulley 42 continues to rotate at the surfaces 90, 92, the shock absorbing members 66,68 as well as the compliance coupling 60, absorb the lost motion of the pulley assembly 40 and enable the pulley assembly 40 to turn without being jammed. As the motor 32 is reversed, a gap 98 exists between the compliance coupling 60 and the bottom shock absorbing member 68. The compliance member 60 freely moves axially in the pulley assembly 40 in the opposite direction through the gap 98. As the member 22 encounters the other surface 92, the shock absorbing member 68 at the bottom end of the cup shaped body 44 is contacted absorbing the shock of the drive. Accordingly, a gap is created on the other side of the compliance coupling 60. Thus, the present device enables an electric linear cylinder to be utilized in general applications without the necessity of a preprogrammed deceleration program.

The present disclosure has been described with reference to a preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:
1. An electric cylinder comprising:
a cylinder housing;
an electric motor assembly for driving a clamping assembly between a first and second position;
the electric motor assembly further comprising an electric motor including a rotary output;
the clamping assembly further comprising a drive pulley assembly coupled with the rotary output;
a lead screw is rotatably coupled with the drive pulley assembly for axial movement, the lead screw moves between the first and second positions; and
a compliance coupling is positioned between the lead screw and the drive pulley assembly, the compliance coupling is axially movable in the drive pulley assembly for absorbing shock when the piston assembly encounters a stop.

2. The electric cylinder of claim 1, further comprising a lead nut positioned between the lead screw and the compliance coupling, the lead nut translating the rotary motion of the drive pulley assembly into linear motion of the lead screw.

3. The electric cylinder of claim 1, further comprising a shock absorbing member in the drive pulley assembly for absorbing axial end of travel shock loading of the compliance coupling.

4. The electric cylinder of claim 1, further comprising the compliance coupling including at least one member for rotationally fixing the compliance coupling with the drive pulley assembly and enabling axial movement with respect to the drive pulley assembly.

5. The electric cylinder of claim 1, wherein the drive pulley assembly includes a cup shaped body to receive the compliance coupling and a lead nut.

6. The electric cylinder of claim 1, further comprising a drive belt coupled with the motor rotary output and the drive pulley assembly.

7. A device for absorbing end stroke impact shock energy of an electric cylinder comprising:
   an electric motor assembly for driving a clamping assembly between a first and second position;
   the electric motor assembly further comprising an electric motor including a rotary output;
   the clamping assembly further comprising a drive pulley assembly coupled with the rotary output;
   a lead screw is rotatably coupled with the drive pulley assembly for axial movement, the lead screw moves between the first and second positions; and
   a compliance coupling positioned between the lead screw and the drive pulley assembly, the compliance coupling axially movable in the drive pulley assembly for absorbing shock when the piston assembly encounters a hard stop.

8. The device of claim 7, further comprising a lead nut positioned between the lead screw and the compliance coupling, the lead nut translating the rotary motion of the drive pulley assembly into linear motion of the lead screw.

9. The device of claim 7, further comprising a shock absorbing member in the drive pulley assembly for absorbing axial end of travel shock of the compliance coupling.

10. The device of claim 7, further comprising the compliance coupling including at least one member for rotationally fixing the compliance coupling with the drive pulley assembly and enabling axial movement with respect to the drive pulley assembly.

11. The device of claim 7, wherein the drive pulley assembly includes a cup shaped body to receive the compliance coupling and a lead nut.

12. The device of claim 7, further comprising a drive belt coupled with the motor rotary output and the drive pulley assembly.

13. A compliance device for absorbing lost motion to enable unjamming of drive components of an electric cylinder comprising:
   an electric motor assembly including an electric motor including a rotary output;
   a drive pulley assembly coupled with the rotary output;
   a lead screw is rotatably coupled with the drive pulley assembly for axial movement, the lead screw moving between a first and second position; and
   a compliance coupling positioned between the lead screw and the drive pulley assembly, the compliance coupling axially movable in the drive pulley assembly for absorbing lost motion when the piston assembly encounters a stop preventing jamming of the drive components.

14. The compliance device of claim 13, further comprising a lead nut positioned between the lead screw and the compliance coupling, the lead nut translating rotary motion of the drive pulley assembly into linear motion of the lead screw.

15. The compliance device of claim 13, further comprising a shock absorbing member in the drive pulley assembly for absorbing end of travel axial shock loading of the compliance coupling.

16. The compliance device of claim 13, further comprising the compliance coupling including at least one member for rotationally fixing the compliance coupling with the drive pulley assembly and enabling axial movement with respect to the drive pulley assembly.

17. The compliance device of claim 13, wherein the drive pulley assembly includes a cup shaped body housing the compliance coupling and a lead nut.

18. The compliance device of claim 13, further comprising a drive belt coupled with the motor rotary output and the drive pulley assembly.

* * * * *